(12) United States Patent
Ojima et al.

(10) Patent No.: US 12,258,080 B2
(45) Date of Patent: Mar. 25, 2025

(54) STEERING SYSTEM FOR VEHICLE

(71) Applicants: HONDA MOTOR CO., LTD., Tokyo (JP); THYSSENKRUPP PRESTA AKTIENGESELLSCHAFT, Eschen (LI)

(72) Inventors: Yosuke Ojima, Tokyo (JP); Munetsugu Hanji, Tokyo (JP); Yoshinobu Watanabe, Tokyo (JP); Imre Szepessy, Mauren (LI); Miklos Aranyi, Rebstein (CH)

(73) Assignees: HONDA MOTOR CO., LTD., Tokyo (JP); THYSSENKRUPP PRESTA AKTIENGESELLSCHAFT, Eschen (LI)

(*) Notice: Subject to any disclaimer, the term of this patent is extended or adjusted under 35 U.S.C. 154(b) by 214 days.

(21) Appl. No.: 18/002,980

(22) PCT Filed: Mar. 2, 2021

(86) PCT No.: PCT/JP2021/007837
§ 371 (c)(1),
(2) Date: Dec. 22, 2022

(87) PCT Pub. No.: WO2022/185397
PCT Pub. Date: Sep. 9, 2022

(65) Prior Publication Data
US 2023/0286574 A1   Sep. 14, 2023

(51) Int. Cl.
*B62D 5/04* (2006.01)
*B62D 6/00* (2006.01)
(Continued)

(52) U.S. Cl.
CPC ........... *B62D 5/0484* (2013.01); *B62D 6/008* (2013.01); *B62D 15/021* (2013.01); *B60W 2050/0075* (2013.01); *B62D 5/006* (2013.01)

(58) Field of Classification Search
CPC .......... B62D 5/00; B62D 5/001; B62D 5/005; B62D 5/006; B62D 5/008; B62D 5/0409;
(Continued)

(56) References Cited

U.S. PATENT DOCUMENTS

2003/0078714 A1* 4/2003 Kitano ..................... B62D 1/10
701/41
2006/0129294 A1 6/2006 Moser et al.
(Continued)

FOREIGN PATENT DOCUMENTS

DE 102020104463 A1 9/2020
EP 2915723 A2 9/2015
(Continued)

OTHER PUBLICATIONS

Mi et al., The Two-Mode Control for Steer-by-Wire System, 2018, IEEE (Year: 2018).*
(Continued)

*Primary Examiner* — Russell Frejd
*Assistant Examiner* — Sara J Lewandroski
(74) *Attorney, Agent, or Firm* — Armstrong Teasdale LLP

(57) ABSTRACT

Provided is a steer-by-wire steering system (1) for a vehicle (2) that can appropriately bring the steered angle of the wheels to a prescribed relationship to the steering angle of a steering member (10) even when the steering angle of the steering member was changed while the vehicle was parked. When the steered angle of the wheels deviates from the prescribed relationship with the steering angle of the steering member upon startup (ST2: Yes), the control unit (15) drives at least one of the steering actuator (12) and the reaction force actuator (13) to bring the steered angle (α) of the wheels closer to the prescribed relationship with the steering angle (β) of the steering member (ST12) using a change in the transmission shift position from the park
(Continued)

position (P) or the neutral position (N) to the travel position (D or R) as a trigger (ST8: Yes).

8 Claims, 9 Drawing Sheets

(51) Int. Cl.
  *B62D 15/02* (2006.01)
  *B60W 50/00* (2006.01)
  *B62D 5/00* (2006.01)
(58) Field of Classification Search
  CPC .... B62D 5/0457; B62D 5/046; B62D 5/0463; B62D 5/0466; B62D 5/0481; B62D 5/0484; B62D 5/0493; B62D 6/00; B62D 6/001; B62D 6/002; B62D 6/008; B62D 15/00; B62D 15/02; B62D 15/021; B62D 15/0215; B62D 15/022; B62D 15/0225; B62D 15/024; B62D 15/0245; B62D 15/025; B60W 2050/0075; B60W 2050/0082; B60W 2050/0083; B60W 2050/0085; B60W 2050/0086; B60W 2050/0087; B60W 2050/0088
  See application file for complete search history.

(56) References Cited

U.S. PATENT DOCUMENTS

2015/0251688 A1* 9/2015 Mayer ................. G05G 5/05
                                                                   180/402
2022/0410966 A1* 12/2022 Fujita .................. B62D 15/022

FOREIGN PATENT DOCUMENTS

| JP | 2007008453 A | * | 1/2007 | ............. B66F 11/04 |
| JP | 2007153109 A | | 6/2007 | |
| WO | 2019052651 A1 | | 3/2019 | |

OTHER PUBLICATIONS

PCT International Search Report for Patent Application PCT/JP2021/007837 mailed Nov. 22, 2021; 3 pp.

* cited by examiner

STEERING SYSTEM FOR VEHICLE

CROSS-REFERENCE TO RELATED APPLICATION

This application is a U.S. National Phase Application of PCT/JP2021/007837, filed on Mar. 2, 2021. The content of this application is hereby expressly incorporated by reference in its entirety.

TECHNICAL FIELD

The present invention relates to a steer-by-wire steering system for a vehicle.

BACKGROUND ART

Known is a steer-by-wire steering system for a vehicle which includes a steering member such as a steering wheel configured to be operated by a driver, and a steering mechanism mechanically separated from the steering member and configured to change the steered angle of the wheels. The steering mechanism is driven by a steering actuator that generates a driving force to change the steering angle of the wheels. A reaction force actuator applies a reaction force to the steering member in response to the steering operation. In such a steering system, in the event that the steering angle of the steering member should deviate from a prescribed relationship with the steered angle of the wheels because the steering member is moved after the ignition switch of the vehicle is turned off, and the ignition switch is turned on thereafter, the wheels will be steered by the steering actuator until the steered angle of the wheels coincides with the steering angle of the steering member. See Patent Document 1, for instance. According to Patent Document 1, the timing of steering the wheels is preferably selected to be before the vehicle starts traveling, and more preferably before the engine is started. Patent Document 1 further teaches to drive the wheels under the conditions that all the doors are closed, the transmission shift position is in the parking range, the brake pedal is depressed, and so on.

CITATION LIST

Patent Literature

JP2007-153109A

SUMMARY OF INVENTION

Technical Problem

According to the invention disclosed in Patent Document 1, the wheels may be steered even as soon as the ignition is turned on without regard to the intention of the driver to travel forward. Therefore, the steered angle of the wheels may change before the driver has fully checked the environment surrounding the vehicle in advance of starting to move the vehicle forward so that the driver may experience some discomfort.

In view of such a problem of the prior art, a primary object of the present invention is to provide a steer-by-wire steering system for a vehicle that can appropriately bring the steering angle of the steering member into a prescribed relationship with the steered angle of the wheels even when the steering angle of the steering member was changed while the vehicle was parked.

Solution of Problem

To achieve such an object, the present invention provides a steering system (1) for a vehicle (2) provided with a transmission device (35) configured to be operated by a driver and having transmission shift positions (SP) including at least a park position or a neutral position and a travel position, comprising: a steering member (10) configured to accept steering operation; a steering mechanism (11) mechanically separated from the steering member and configured to steer wheels (3) of the vehicle; a steering angle sensor (21) that detects a steering angle ($\beta$) of the steering member; a steered angle sensor (32) that detects a steered angle ($\alpha$) of the wheels; a steering actuator (12) configured to provide a drive force to the steering mechanism; a reaction force actuator (13) configured to apply a reaction force to the steering member in response to the steering operation; and a control unit (15) configured to control the steering actuator so as to cause the steered angle of the wheels to be in a prescribed relationship with the steering angle of the steering member, and control the reaction force actuator so as to cause the reaction force to correspond to a steered state of the wheels, wherein when the steered angle of the wheels deviates from the prescribed relationship with the steering angle of the steering member upon startup (ST2: Yes), the control unit is configured to drive at least one of the steering actuator and the reaction force actuator to bring the steered angle of the wheels closer to the prescribed relationship with the steering angle of the steering member (ST12) using a change in the transmission shift position from the park position or the neutral position to the travel position as a trigger (ST8: Yes). Here, the "travel position" may include the drive position, the reverse position, the first speed position, and the second speed position.

Thus, the steered angle of the wheels and the steering angle of the steering member are brought closer to the prescribed relationship using the changing of the transmission shift position from the park position or the neutral position to a travel position as the trigger. Therefore, only when the driver actually intends to start traveling forward, the steered angle of the wheels and the steering angle of the steering member can be brought closer to the prescribed relationship.

Preferably, when a direction of the steering angle of the steering member and a direction of the steered angle of the wheels coincide with each other upon the startup (ST6: No), the control unit is configured to drive the steering actuator to bring the steered angle of the wheels closer to the prescribed relationship with the steering angle of the steering member (ST11) using an operation applied to the steering member as a trigger (ST10: No).

Thus, by using an operation applied to the steering member as a trigger to bring the steered angle of the wheels closer to the prescribed relationship with the steering angle of the steering member, the wheels are prevented from being steered without the driver anticipating this to happen.

Preferably, when a direction of the steering angle of the steering member and a direction of the steered angle of the wheels coincide with each other upon the startup (ST6: No), following an event where the steering actuator is started to be driven using an operation applied to the steering member as a trigger, the control unit is configured to cease driving the steering actuator using the operation being ceased to be applied to the steering member as a trigger (ST10: Yes).

Since the steered angle of the wheels is kept constant by ceasing the driving of the steering actuator following the ceasing of the operation of the steering member, the steered angle of the wheels is prevented from changing while no operation is applied to the steering member, and the operator is thereby prevented from experiencing discomfort.

Preferably, when a direction of the steering angle of the steering member and a direction of the steered angle of the wheels disagree from each other upon the startup (ST6: Yes), the control unit is configured to drive at least one of the steering actuator and the reaction force actuator to bring the steered angle of the wheels closer to the prescribed relationship (ST12) with the steering angle of the steering member without regard if an operation is applied to the steering member or not.

Thus, when the direction of the steering angle of the steering member and the direction of the steered angle of the wheels are opposite to each other, the steered angle of the wheels is caused to be brought closer to the prescribed relationship with the steering angle of the steering member upon changing of the transmission shift position from the park position or neutral position to the travel position without regard if an operation is applied to the steering member or not.

Preferably, when the direction of the steering angle of the steering member and the direction of the steered angle of the wheels are opposite to each other at startup (ST6: Yes), following an event where at least one of the steering actuator and the reaction force actuator is driven by using a change in the transmission shift position as a trigger, the control unit is configured to stop either the steering actuator or the reaction force actuator by using an agreement in the direction of the steering angle of the steering member and the direction of the steered angle of the wheels as a trigger (ST6: No).

Thus, also when the steering member is not operated, the steering angle of the steering member and/or the steered angle of the wheels are prevented from being changed unnecessarily, and the vehicle is prevented from traveling in a direction not anticipated by the driver.

Preferably, the control unit is configured to drive the steering actuator (ST11) so as to bring the steered angle of the wheels closer to the prescribed relationship with the steering angle of the steering member when the steering member is operated (ST10: No) under a condition where the direction of the steering angle of the steering member and the direction of the steered angle of the wheels are opposite to each other (ST6: Yes), and the transmission shift position is in the park position or the neutral position (ST8: No).

Thus, when the direction of the steered angle of the wheels and the direction of the steering angle of the steering member are opposite to each other, by using the operation of the steering member as a trigger, the steered angle of the wheels can be brought closer to the prescribed relationship with the steering angle of the steering member without causing any discomfort to the driver.

Preferably, when the vehicle has started traveling (ST4: Yes) with the steered angle of the wheels deviated from the prescribed relationship to the steering angle of the steering member at startup (ST2: Yes), the control unit is configured to set an upper limit to the vehicle speed until the steered angle of the wheels has come into the prescribed relationship with the steering angle of the steering member (ST13).

Thereby, the vehicle is prevented from traveling at high speed in a direction different from the direction intended by the driver.

Preferably, when the vehicle has started traveling (ST4: Yes) with the steered angle of the wheels deviated from the prescribed relationship with the steering angle of the steering member at startup, the control unit is configured to drive the steering actuator so as to bring the steered angle of the wheels closer to the prescribed relationship with the steering angle of the steering member (ST16) without regard if the steering member is operated or not, and to release the upper limit of the vehicle speed once the steered angle of the wheels is brought to the prescribed relationship with the steering angle of the steering member (ST2: No).

Thereby, also when the steering member is not operated, the vehicle is prevented from traveling at high speed in a direction different from the direction intended by the driver.

Preferably, the control unit is configured to drive the steering actuator (ST16) so that a change speed of the steered angle of the wheels decreases with an increase in the vehicle speed when the steering member is not operated (ST15: Yes).

Thus, when the vehicle speed is so low that the change in the steered angle of the wheels causes very little change in the vehicle behavior, the steered angle of the wheels is changed at a relatively high speed. On the other hand, when the vehicle speed is so high that the change in the steered angle of the wheels causes a significant change in the vehicle behavior, the change in the steered angle of the wheels is restricted with the result that the vehicle is prevented from demonstrating any unexpected behavior.

Preferably, the control unit is configured to drive the steering actuator (ST17) so that the steered angle of the wheels changes faster when the steering member is operated (ST15: No) than when the steering member is not operated (ST15: Yes).

Thus, the steered angle of the wheels can be changed at a high speed during the steering operation because the driver can easily predict the behavior of the vehicle at such a time. Thereby, the steered angle of the wheels can be brought to the prescribed relationship to the steering angle of the steering member at an early stage.

Advantageous Effects of Invention

The present invention thus provides a steering system for a vehicle that can appropriately bring the steered angle of the wheels to the prescribed relationship to the steering angle of the steering member even when the steering angle of the steering member was changed while the vehicle was parked.

DESCRIPTION OF EMBODIMENTS

Figure 1:
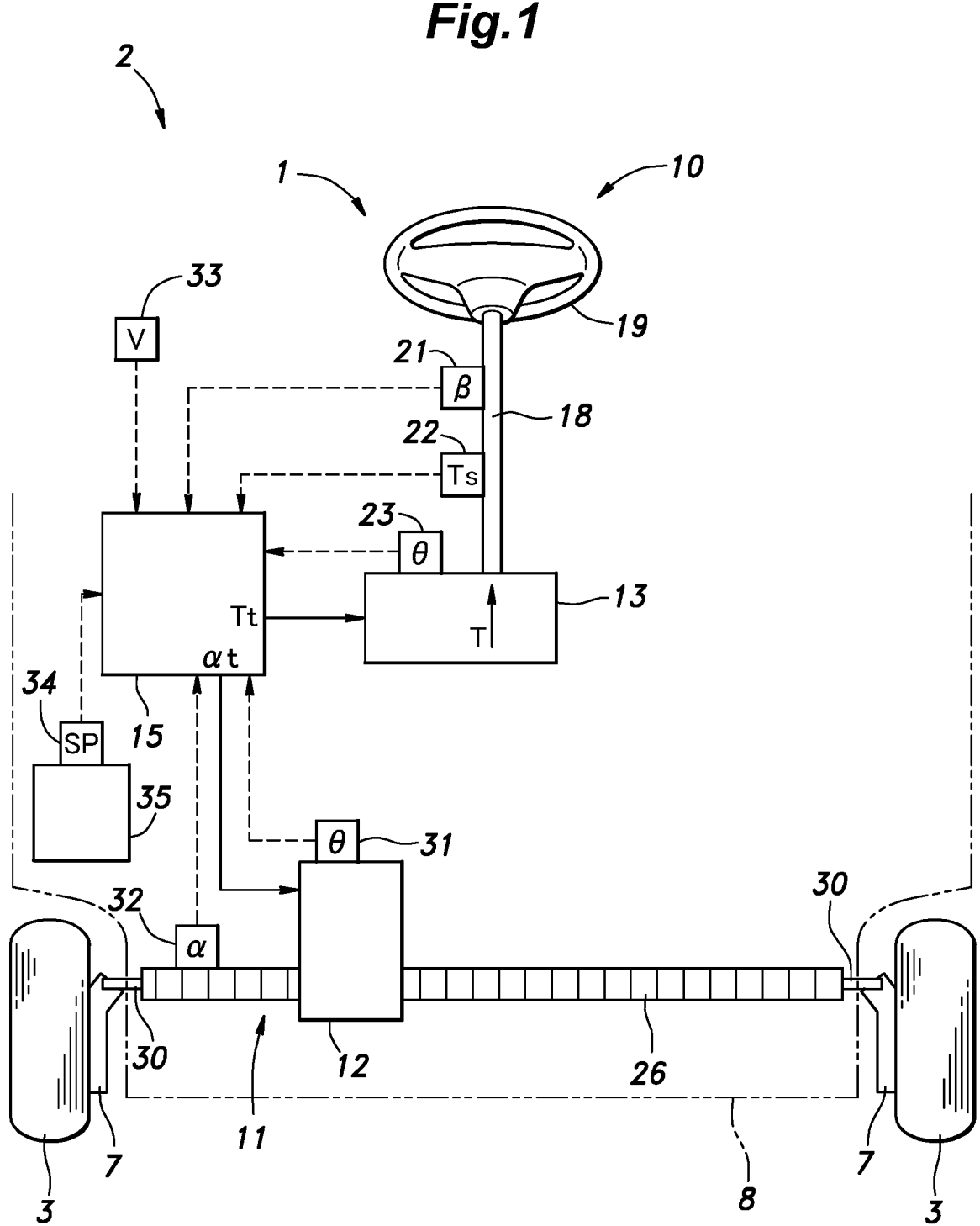
FIG. 1 is a schematic diagram of a steering system according to an embodiment of the present invention.

A steering system 1 for a vehicle 2 according an embodiment of the present invention is described in the following. As shown in FIG. 1, the steering system 1 consists of a steer-by-wire (SBW) steering system. The vehicle 2 fitted with the steering system 1 is a four-wheeled vehicle having left and right front wheels 3 and left and right rear wheels (not shown in the drawings). The left and right front wheels 3 are supported by a vehicle body 8 (only the outline of a lower part thereof is shown in FIG. 1) via respective knuckles 7 so that the steered angle $\alpha$ of the front wheels 3 can be changed, and the front wheels 3 thus serve as steerable wheels. The steered angle $\alpha$ refers to the angle of the front wheels 3 with respect to the fore and aft direction in plan view. The steering system 1 thus changes the steered angle $\alpha$ of the front wheels 3.

The steering system 1 includes a steering member 10 rotatably provided on the vehicle body 8, a steering mechanism 11 for steering the front wheels 3, a steering actuator 12 for applying a driving force to the steering mechanism 11, a reaction force actuator 13 that applies a reaction torque T to the steering member 10, and a control unit 15 that controls the reaction force actuator 13 and the steering actuator 12. The steering system 1 may be a redundant system that includes a plurality of sets each of which is provided with a steering actuator 12, a reaction force actuator 13, and a control unit 15.

The steering member 10 accepts a steering operation by the driver. The steering member 10 includes a steering shaft 18 rotatably supported by the vehicle body 8 and a steering wheel 19 provided at an end of the steering shaft 18. The steering shaft 18 is rotatably supported by a steering column 20 provided on the vehicle body 8, and has a rear end thereof projecting rearward from the steering column 20. The steering wheel 19 is connected to the rear end of the steering shaft 18 so as to rotate integrally with the steering shaft 18.

The reaction force actuator 13 consists of an electric motor which is connected to the steering shaft 18 via a gear mechanism. When the reaction force actuator 13 is driven, the driving force is transmitted to the steering shaft 18 as a rotational force. The reaction force actuator 13 applies a rotational torque to the steering member 10. The torque applied to the steering member 10 by the reaction force actuator 13 in response to the steering operation is called a reaction torque T.

The steering system 1 is further provided with a steering angle sensor 21 that detects the rotational angle of the steering shaft 18 around the central axis thereof as a steering angle $\beta$. The steering angle sensor 21 may be a per se known rotary encoder. Further, the steering system 1 is provided with a torque sensor 22 that detects the torque applied to the steering shaft 18 as a steering torque Ts. The torque sensor 22 detects the steering torque Ts applied to a part of the steering shaft 18 located between the steering wheel 19 and the reaction force actuator 13. The steering torque Ts is determined by the operating torque applied to the steering wheel 19 by the driver and the reaction torque T applied to the steering shaft 18 by the reaction force actuator 13. The torque sensor 22 may consist of a per se known torque sensor such as a magnetostrictive torque sensor or a strain gauge, or, alternatively, the steering torque may be estimated from the value of the electric current flowing through the electric motor of the reaction force actuator 13.

The steering system 1 further includes a first rotational angle sensor 23 that detects the rotational angle $\theta$ of the reaction force actuator 13. The first rotational angle sensor 23 may be a per se known resolver or rotary encoder.

The steering mechanism 11 has a rack 26 extending in the vehicle lateral direction. The rack 26 is supported by a gear housing 27 so as to be movable in the vehicle lateral direction. The left and right ends of the rack 26 are respectively connected to knuckles 7 that support the left and right front wheels 3 via respective tie rods 30. As the rack 26 moves in the vehicle lateral direction, the steered angle $\alpha$ of the front wheels 3 changes. The steering mechanism 11 is mechanically separated from the steering member 10.

The steering actuator 12 consists of an electric motor. The steering actuator 12 moves the rack 26 in the vehicle lateral direction according to the signal from the control unit 15, and changes the steered angle $\alpha$ of the left and right front wheels 3 accordingly.

The steering system 1 is further provided with a second rotational angle sensor 31 that detects the rotational angle $\theta$ of the steering actuator 12. The second rotational angle sensor 31 may be a per se known resolver or rotary encoder. Further, the steering system 1 has a steered angle sensor 32 that detects the steered angle $\alpha$ of the front wheels 3. In the present embodiment, the steered angle sensor 32 consists of a rack stroke sensor that detects the rack position (the position of the rack 26 along the lateral direction of the vehicle), and the steered angle $\alpha$ of the front wheels 3 is determined from the rack position.

The control unit 15 consists of an electronic control unit including a CPU, memory, a storage device for storing a program, and the like. The steering angle sensor 21, the torque sensor 22, the first rotational angle sensor 23, the second rotational angle sensor 31, and the steered angle sensor 32 are connected to the control unit 15. Based on the signals from these sensors, the control unit 15 acquires signals corresponding to the steering angle $\beta$, the steering torque Ts, the rotational angle $\theta$ of the reaction force actuator 13, the rotational angle $\theta$ of the steering actuator 12, and the steered angle $\alpha$. Further, the control unit 15 is connected to a vehicle speed sensor 33, and a shift position sensor 34, and acquires signals corresponding to the vehicle speed V and the transmission shift position SP of a transmission device 35.

The transmission device 35 is a device that changes the mode of power transmission from the drive source mounted on the vehicle 2 to the wheels. For example, when the vehicle 2 is equipped with an internal combustion engine as a propelling drive source, the transmission device 35 is a device that changes the mode of driving force transmission from the internal combustion engine to the driven wheels. Further, when the vehicle 2 is equipped with an electric motor as a propelling drive source, the transmission device 35 is a power unit that changes the mode of driving force transmission from the electric motor to the driven wheels.

In the case of an automatic transmission device, the transmission device 35 includes a park position "P", a neutral position "N", a drive position "D", and a reverse position "R" as transmission shift positions SP representing different driving force transmission modes. The drive position "D" may have one range, or may have a plurality of ranges including the first speed, the second speed, and the like. When the transmission device 35 is a manual transmission device, the transmission device 35 has a neutral position "N", a drive position "D", and a reverse position "R". The drive position "D" may have a plurality of ranges such as 1st speed to 5th speed. Hereinafter, the drive position "D" and the reverse position "R" are collectively referred to as the travel position.

The transmission shift position SP of the transmission device 35 is switched by the driver's switching operation performed to a switching member such as a shift lever or a shift button. The shift button may be a function button displayed on a touch panel display. The shift position sensor 34 acquires a signal corresponding to the transmission shift position SP of the transmission device 35 switched by the driver. The vehicle system provided with the control unit 15 is configured to be turned on and off only when the transmission device 35 is in the park position "P" or the neutral position "N".

The control unit 15 is connected to the reaction force actuator 13 and the steering actuator 12, and controls the reaction force actuator 13 and the steering actuator 12. The control unit 15 controls the steering actuator 12 according to the steering angle β, and controls the reaction force actuator 13 according to the steered angle α.

The control action of the control unit 15 in the SBW mode is specifically described in the following. The control unit 15 computes a target steered angle at having a prescribed relationship with the steering angle β according to the actual steering angle β detected by the steering angle sensor 21. The control unit 15 may compute the target steered angle αt by, for example, multiplying the steering angle β by a predetermined gear ratio K(αt=R×K). The gear ratio K may be, for example, 0.01 to 0.5, and is preferably 0.125. Then, the control unit 15 computes a first current value A1 to be supplied the steering actuator 12 according to the deviation Δα(=αt−α) between the target steered angle αt and the actual steered angle α so that the steered angle α coincides with the target steered angle αt. In other words, the control unit 15 performs a feedback control of the steering actuator 12 according to the deviation Δα. With an increase in the deviation Δα, the first current value A1 supplied to the steering actuator 12 becomes greater, and the output of the steering actuator 12 is increased with the result that the amount of change in the steered angle α increases.

The control unit 15 computes the target reaction torque Tt to be generated by the reaction force actuator 13 according to the steering state of the front wheels 3, in particular according to the deviation Δα. The target reaction torque Tt may be computed by multiplying Δα by a predetermined coefficient. Then, the control unit 15 computes a second current value A2 to be supplied to the reaction force actuator 13 according to the computed target reaction torque Tt. The second current value A2 to be supplied to the reaction force actuator 13 may be determined by referring to a predetermined map according to the target reaction torque Tt. Alternatively, the control unit 15 may determine the second current value A2 by referring to a predetermined map according to the deviation Δα. The target reaction torque Tt and the second current value A2 become greater in value as the deviation Δα of the steered angle α increases.

The control unit 15 supplies the second current value A2 to the reaction force actuator 13 and generates a driving force in the reaction force actuator 13. The driving force generated by the reaction force actuator 13 is applied to the steering shaft 18 as a reaction torque T that opposes the operation input of the driver. As a result, the driver can receive a reaction force (resistance force) against the steering operation from the steering wheel 19.

The control unit 15 is activated when the ignition switch of the vehicle 2 is turned on, and is deactivated when the ignition switch is turned off. Therefore, with the ignition switch turned off, even if the steering member 10 is turned and the steering angle β changes, the steered angle α of the front wheels 3 does not change, and no reaction torque T is produced. Therefore, while the ignition switch is turned off, the steering angle β of the steering member 10 and the steered angle α of the front wheels 3 may deviate from the above-mentioned prescribed gear ratio relationship. In the following disclosure, the two angles which are normalized by taking into account the gear ratio are referred to as phases, and the angular deviation from the prescribed relationship between the steered angle α and the steering angle β is referred to as the phase difference. The phase difference can be created in a plurality of different types.

Figure 2:
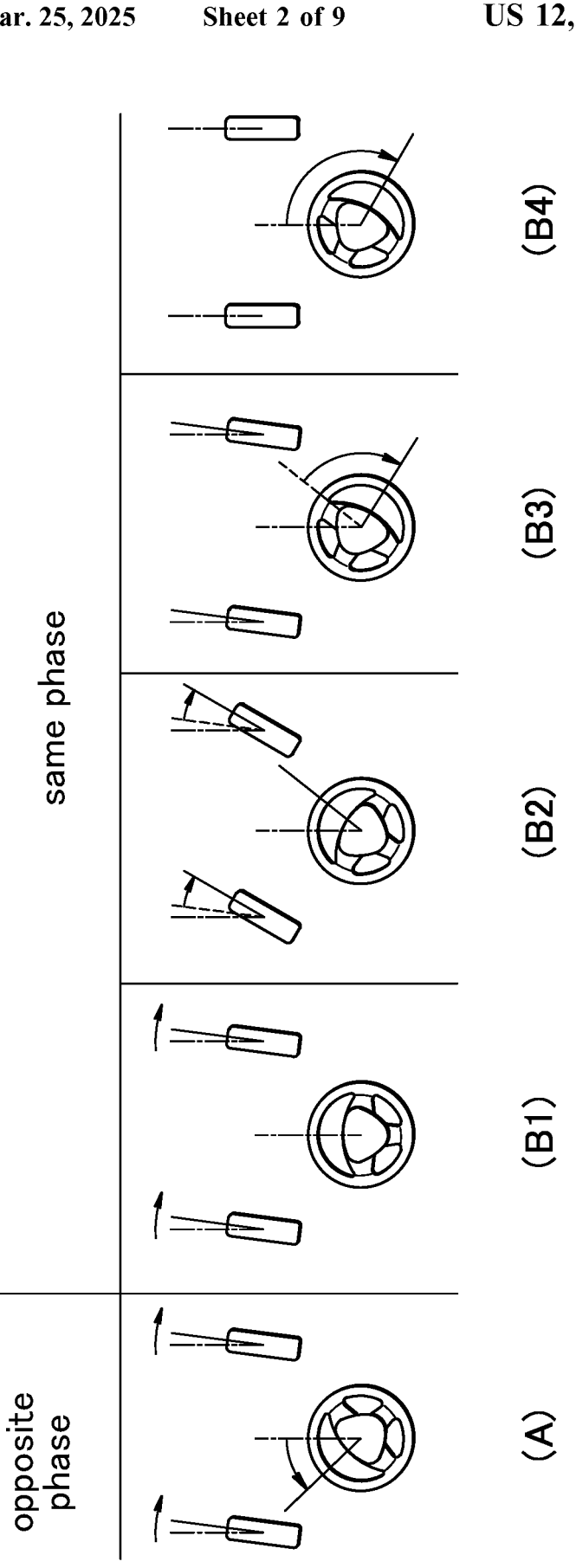
FIG. 2 is a schematic diagram illustrating the relationship between the steering angle of a steering member and the steered angle of the front wheels.
Figure 3:
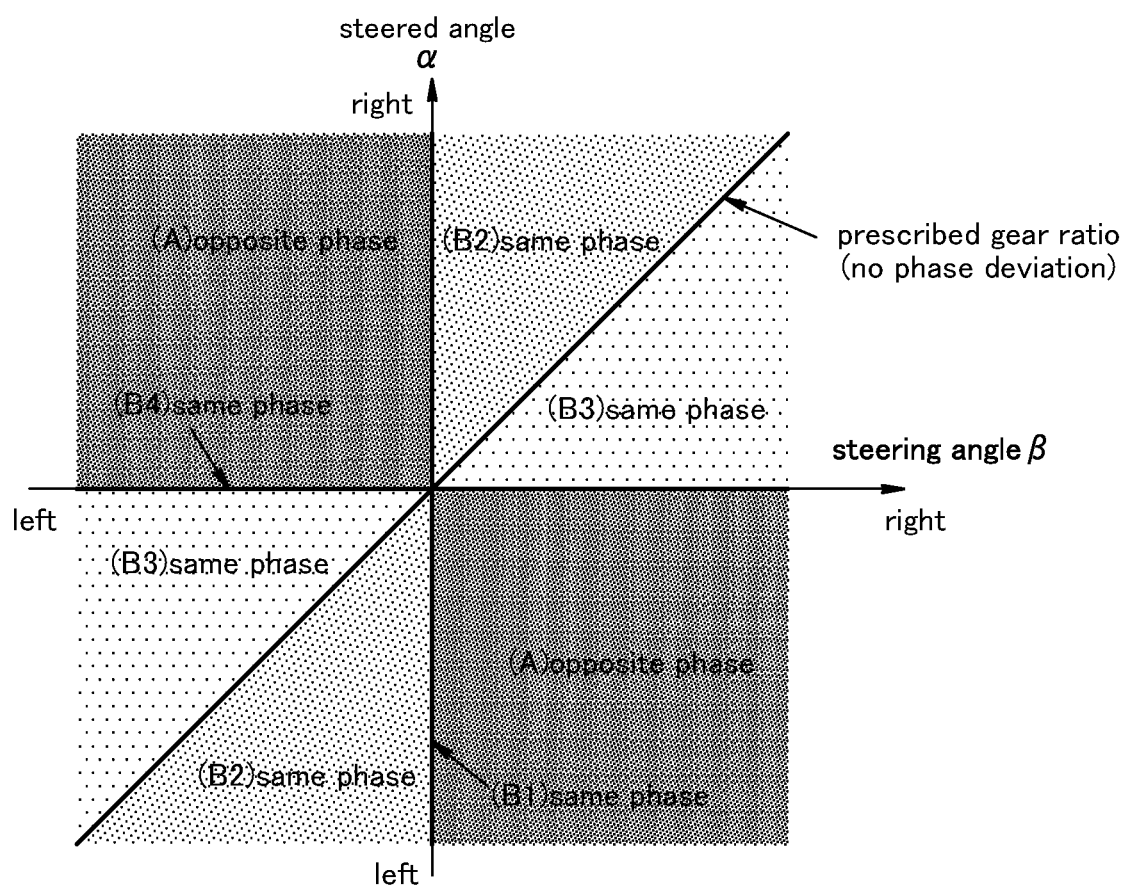
FIG. 3 is a graph showing the relationship between the steering angle of a steering member and the steered angle of the front wheels.

FIG. 2 is a diagram showing a phase relationship between the steering angle β of the steering member 10 and the steered angle α of the front wheels 3. As shown in FIG. 2, the phases of the steering angle β and the steered angle α may deviate from each other in two different types; type A or an opposite phase relationship where the phases of the steering angle β and the steered angle α are opposite to each other, and type B or a same phase relationship where the phases of the steering angle β and the steered angle α agree with each other. When only one of the phases of the steering angle β and the steered angle α is 0, or within a prescribe small angular range around zero, the two phases are regarded as the same. Thus, type B can be further classified into four types; type β1 where the steering angle β is 0 and the steered angle α is not 0, type β2 where the phase of the steered angle α is greater than the phase of the steering angle β, type β3 where the phase of the steered angle α is smaller than the phase of the steering angle β, and type β4 where the steering angle β is greater than 0 in either direction and FIG. 3 is a graph showing the relationship between the steering angle β of the steering member 10 and the steered angle α of the front wheels 3 which includes the single opposite phase type, and the four same phase types.

Figure 4:
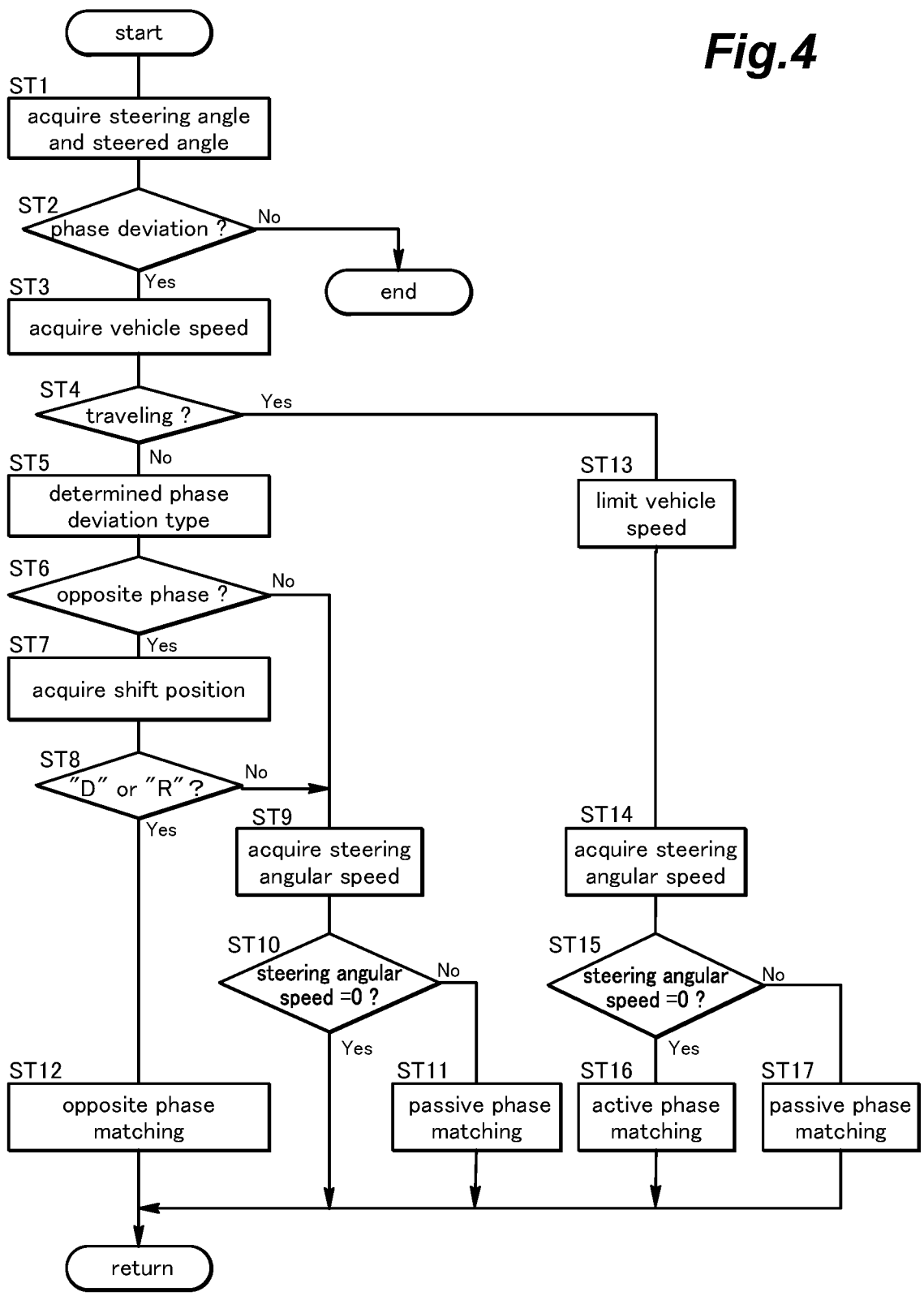
FIG. 4 is a flow chart of a phase matching control executed by a control unit at startup.

Since the phase relationship between the steering angle θ and the steered angle α may be disturbed while the ignition switch is off, the control unit 15 performs a phase matching control process as shown in FIG. 4 when the ignition switch is turned on and the control unit 15 is activated.

FIG. 4 shows a flowchart of the phase matching control process executed by the control unit 15 at startup. As shown in FIG. 4, upon activation, the control unit 15 acquires the steering angle β and the steered angle α (step ST1), and determines if there is any deviation between the phases of the steering angle β and the steered angle α (Step ST2). In step ST2, it is determined if the phase relationship between the steering angle β and the steered angle α deviates from the predetermined gear ratio relationship (if the phase relationship deviates from the oblique gear ratio line K shown in FIG. 3). If the phases of the steering angle β and the steered angle α coincide with each other (ST2: No), the control unit 15 concludes this process.

If the phases of the steering angle β and the steered angle α deviate from each other (ST2: Yes), the control unit 15 acquires the vehicle speed V (step ST3), and determines if the vehicle 2 is traveling (Step ST4). More specifically, the control unit 15 determines that the vehicle 2 is traveling when the vehicle speed V is higher than a predetermined threshold value Vth, and otherwise determines that the vehicle 2 is stationary. When it is determined that the vehicle 2 is stationary (ST4: No), the control unit 15 determines the type of phase deviation according to the steering angle R and the steered angle α (step ST5) to determine if it is the case of the opposite phase relationship (type A) (step ST6).

In the case of the opposite phase relationship (ST6: Yes), the control unit 15 acquires the transmission shift position SP (step ST7), and determines if the transmission shift position SP is either the drive position "D" or the reverse position "R" (step ST8). If the driver has not yet operated the shift lever, and the transmission shift position SP is still in the park position "P" or the neural position "N" (ST8: No), or if the determination result of step ST6 is No, the control unit 15 acquires the steering angular velocity βdot (Step ST9). The control unit 15 determines if the steering angular velocity βdot is 0 (deg/sec) or is within a predetermined small velocity range that can be regarded as 0 (deg/sec) (step ST10). The latter case will be simply referred to as the case of "βdot=0" in the following disclosure for the convenience of description.

When the steering angular velocity βdot is 0 (ST10: Yes), the control unit 15 repeats the above process. When the steering member 10 is operated or steered by the driver and the steering angular velocity βdot is not 0 (ST10: No), the control unit 15 executes a passive phase matching (step ST11). In the passive phase matching in step ST11, at least one of the steering actuator 12 and the reaction force actuator 13 is driven so that the phases of the steering angle β and the steered angle α are brought closer to each other while the steering member 10 is being steered (ST10: No). Here, "bringing the phases of the steering angle β and the steered angle α closer to each other" means that the steering angle β and the steered angle α are brought closer to a prescribed relationship (the gear ratio relationship mentioned above). This phase matching is characterized as "passive" because the phase matching takes place only during a certain action such as a steering operation is being performed. In the present embodiment, the control unit 15 drives the steering actuator 12 in order to match the phases of the steering angle β and the steered angle α.

In the passive phase matching in step ST11, the control unit 15 causes the steering actuator 12 to bring the phases of the steering angle θ and the steered angle α closer to each other using the event of operating the steering member 10 as a trigger (ST10: No). In this way, since the steered angle α is brought closer to the steering angle β in phase by using the operation of the steering member 10 as a trigger, the front wheels 3 is prevented from being steered without the driver anticipating it.

Figure 5:
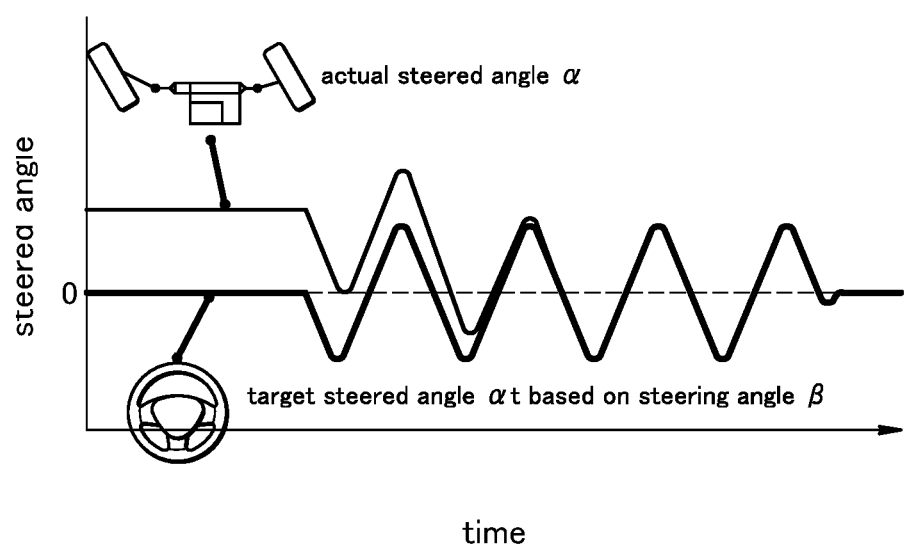
FIG. 5 is a time chart showing changes in the steered angle due to a passive phase matching process.

FIG. 5 is a time chart showing changes in the steered angle α in the passive phase matching. As shown in FIG. 5, in the passive phase matching, the control unit 15 drives the steering actuator 12 so as to gradually reduce the deviation Δα(=αt−α) between the target steered angle αt which is set according to the steering angle β and the actual steered angle α. Even when the steering member 10 is steered in a direction to come closer to the phase of the steered angle α, if the steering speed of the steering member 10 is equal to or higher than a predetermined steering speed, the control unit 15 drives the steering actuator 12 so that the front wheels 3 are steered in the same direction as the steering direction of the steering member 10.

Referring to FIG. 4 once again, in the passive phase matching in step ST11, the control unit 15 repeats the above process, or ceases driving the steering actuator 12 using the event of ceasing the operation of the steering member 10 as a trigger (ST10: Yes). As a result, the steered angle α is kept constant while the steering member 10 is not operated so that the driver is prevented from experiencing any discomfort.

When the driver performs a transmission shift operation to change the transmission shift position SP to the drive position "D" or the reverse position "R", the determination result in step ST8 becomes Yes, and the control unit 15 performs an opposite phase matching (step ST12). The opposite phase matching is a control process in which at least one of the steering actuator 12 and the reaction force actuator 13 is driven so that the phases of the steering angle β and the steered angle α are brought closer to each other, and into the same phase regardless if the steering member 10 is steered or not.

The opposite phase matching in step ST12 is triggered by the occurrence of the event that the transmission shift position SP is changed from the park position "P" or the neutral position "N" to the drive position "D" or the reverse position "R" in the determination process of step ST8. In other words, the control unit 15 starts the opposite phase matching on condition that the transmission shift position SP has been changed from the park position "P" or the neutral position "N" to a travel position. The opposite phase matching may be started immediately after this condition is met, possibly with a certain time delay.

In this way, triggered by the driver's to change the transmission shift position SP from the park position "P" or the neutral position "R" to the travel position, the control unit 15 performs the opposite phase matching in step ST12, and brings the phases of the steered angle α and the steering angle β closer to each other. Therefore, only when the driver intends to start the vehicle, the phases of the steered angle α and the steering angle β are brought closer to each other.

In the present embodiment, the control unit 15 drives the steering actuator 12 in order to bring the steering angle β and the steered angle α into the same phase. In the opposite phase matching (ST12) of the present embodiment, the control unit 15 drives the steering actuator 12 with the target steered angle α t set at 0° (neutral position), and once the steered angle α coincides with the target steered angle α t, and once the phase of the steered angle α becomes the same as the phase of the steering angle β, ceases driving the steering actuator 12. Here, the target steered angle α t may be set to any value as long as it is within a certain range of 0° in the same phase relationship with steering angle β.

The steering actuator 12 ceases to be driven when the control unit 15 has determined that the direction of the steering angle β and the direction of the steered angle α coincide with each other (ST6: No). As a result, even when the steering member 10 is not operated (ST10: Yes), the steered angle α and/or the steering angle β are prevented from unnecessarily changing, and the vehicle 2 is prevented from traveling in a direction which the driver does not expect.

The opposite phase matching in step ST12 is performed regardless of whether the steering member 10 has been operated or not, unlike in the case of the passive phase matching in step ST11. Therefore, when the direction of the steering angle β and the direction of the steered angle α are opposite to each other (ST6: Yes), the phases of the steered angle α and the steering angle β can be brought close to each other immediately after the transmission shift position SP is changed from the park position "P" or the neutral position "N" to the travel position regardless of the operation of the steering member 10.

When the control unit 15 executed the opposite phase matching in step ST12, the type of phase deviation is subsequently determined to be the opposite phase type in step ST6 (ST6: No). In this case, the control process executed by the control unit 15 advances the step ST9, and executes the passive phase matching (ST11) for matching the phases of the steering angle β and the steered angle α with each other while the steering member 10 is not steered (ST10: No).

Further, when the direction of the steering angle β and the direction of the steered angle α are opposite to each other (ST6: Yes), the passive phase matching in step ST11 is executed by using the operation of the steering member 10 (ST10: No) while the transmission shift position SP is the park position "P" or the neutral position "N" (ST8: No) as a trigger. In this way, when the direction of the steering angle β and the direction of the steered angle α are opposite to each other, by using the operation of the steering member 10 as a trigger, the phases of a and the steering angle β can be brought close to each other without causing any discomfort to the driver.

If the vehicle 2 starts traveling without completing the phase matching of the steering angle β and the steered angle α by the passive phase matching in step ST11, it is determined in step ST4 that the vehicle 2 is traveling (ST4: Yes). In this case, the control unit 15 limits the vehicle speed by setting an upper limit value for the vehicle speed V (step ST13). For example, the control unit 15 sets the upper limit value of the vehicle speed V to 10 km/h. Once the phase matching control process is completed, the control unit 15 releases the upper limit value of the vehicle speed V. Therefore, the vehicle 2 is prevented from traveling at a vehicle speed V higher than the upper limit value until the phases of the steering angle β and the steered angle α are matched with each other, and the determination result in step ST2 becomes No or, in other words, until the phase matching control shown in FIG. 4 is completed.

In this way, if the vehicle 2 starts traveling (ST4: Yes) with the phases of the steering angle β and the steered angle α deviated from each other, the steering angle β and the steered angle α, the control unit 15 sets an upper limit value for the vehicle speed V until the phase matching is completed (ST13). As a result, the vehicle 2 is prevented from traveling at high speed in a direction which is not intended by the driver.

Thereafter, the control unit 15 acquires the steering angular velocity βdot (step ST14), and determines whether the steering angular velocity βdot is 0 (step ST15) or not. When the steering angular velocity βdot is 0 (ST15: Yes), the control unit 15 executes an active phase matching (step ST16). The active phase matching is a control action by which at least one of the steering actuator 12 and the reaction force actuator 13 is driven so that the phases of the steering angle β and the steered angle α are gradually brought into agreement after the vehicle 2 has started traveling (ST4: Yes) even when the driver does not steer the steering member 10 (ST15: Yes). In the present embodiment, the control unit 15 drives the steering actuator 12 in order to match the phases of the steering angle β and the steered angle α.

In this way, regardless of whether the steering member 10 is operated or not, the control unit 15 executes the active phase matching in step ST16 so that the vehicle 2 is prevented from traveling at high speed in a direction which is not indented by the driver even when the steering member 10 is not operated. By executing the active phase matching, the phases of the steering angle β and the steered angle α are always brought into agreement after the vehicle 2 has started traveling. The phase matching control is concluded once the determination result in step ST2 becomes No. Thereby, the upper limit of the vehicle speed V is released.

Figure 6:
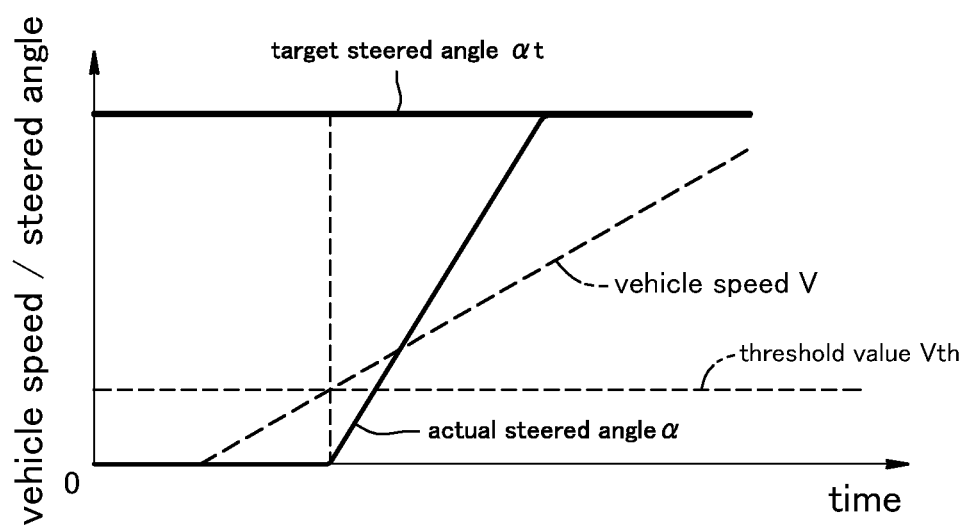
FIG. 6 is a time chart showing changes in steering angle due to an active phase matching process.

FIG. 6 is a time chart showing changes in the steered angle α due to the active phase matching. As shown in FIG. 6, once the vehicle speed V becomes higher than a predetermined threshold value Vth, the control unit 15 initiates the active phase matching, and drives the steering actuator 12 so that the phase deviation between the steering angle β and the steered angle α is decreased.

At this time, in driving the steering actuator 12, the control unit 15 multiplies a deceleration gain G to the first current value A1 computed from to the deviation Δα between the target steered angle αt and the actual steered angle α in order to reduce the changing speed of the steered angle α as compared to the case of the normal steering angle control. As a result, the rate of change of the steered angle α becomes slower than in the normal state, and the vehicle 2 is prevented from behaving in a manner not anticipated by the driver.

The deceleration gain G may be selected so as to change with the vehicle speed V. More specifically, the deceleration gain G may be selected as a relatively large value when the vehicle speed V is low, and may be selected as a smaller value so that the change speed of the steered angle α is made slower with an increase in the vehicle speed V. As a result, when the vehicle speed V is low, and the change in the steered angle α has a small effect on the vehicle behavior, the steered angle α is changed at a relatively high speed. Conversely, when the vehicle speed V is high, and the change in the steered angle α has a large effect on the vehicle behavior, the steered angle α is changed at a relative low speed. Thereby, the vehicle 2 is prevented from behaving in an unexpected manner.

Referring to FIG. 4 once again, when the steering member 10 is steered by the driver while the vehicle 2 is traveling (ST4: Yes), and the steering angular velocity βdot is not 0 (ST15: No), the control unit 15 executes the passive phase matching (Step ST17). In the passive phase matching in step ST17, at least one of the steering actuator 12 and the reaction force actuator 13 is driven so that the phases of the steering angle β and the steered angle α are matched while the steering member 10 is not steered (ST15: No). In the present embodiment, the control unit 15 drives the steering actuator 12 in order to match the phases of the steering angle β and the steered angle α.

In the passive phase matching in step ST17, the control unit 15 drives the steering actuator 12 in such a manner that the change speed of the steered angle α is faster as compared to the case of the active phase matching (ST16) which is executed when the steering member 10 is operated. As a result, the steered angle α is caused to change at a high speed during the steering operation because the driver can easily predict the behavior of the vehicle 2 in such a situation, with the result that the phases of the steering angle β and the steered angle α can be matched at an early stage.

When the phases of the steering angle β and the steered angle α are matched by the passive phase matching in step ST11, the active phase matching in step ST16, or the passive phase matching in step ST17, and the determination result in step ST2 becomes No, the phase matching control is concluded.

Next, examples of vehicle behavior during the phase matching control of FIG. 4 will be described in the following with reference to FIGS. 7 to 9.

Figure 7:
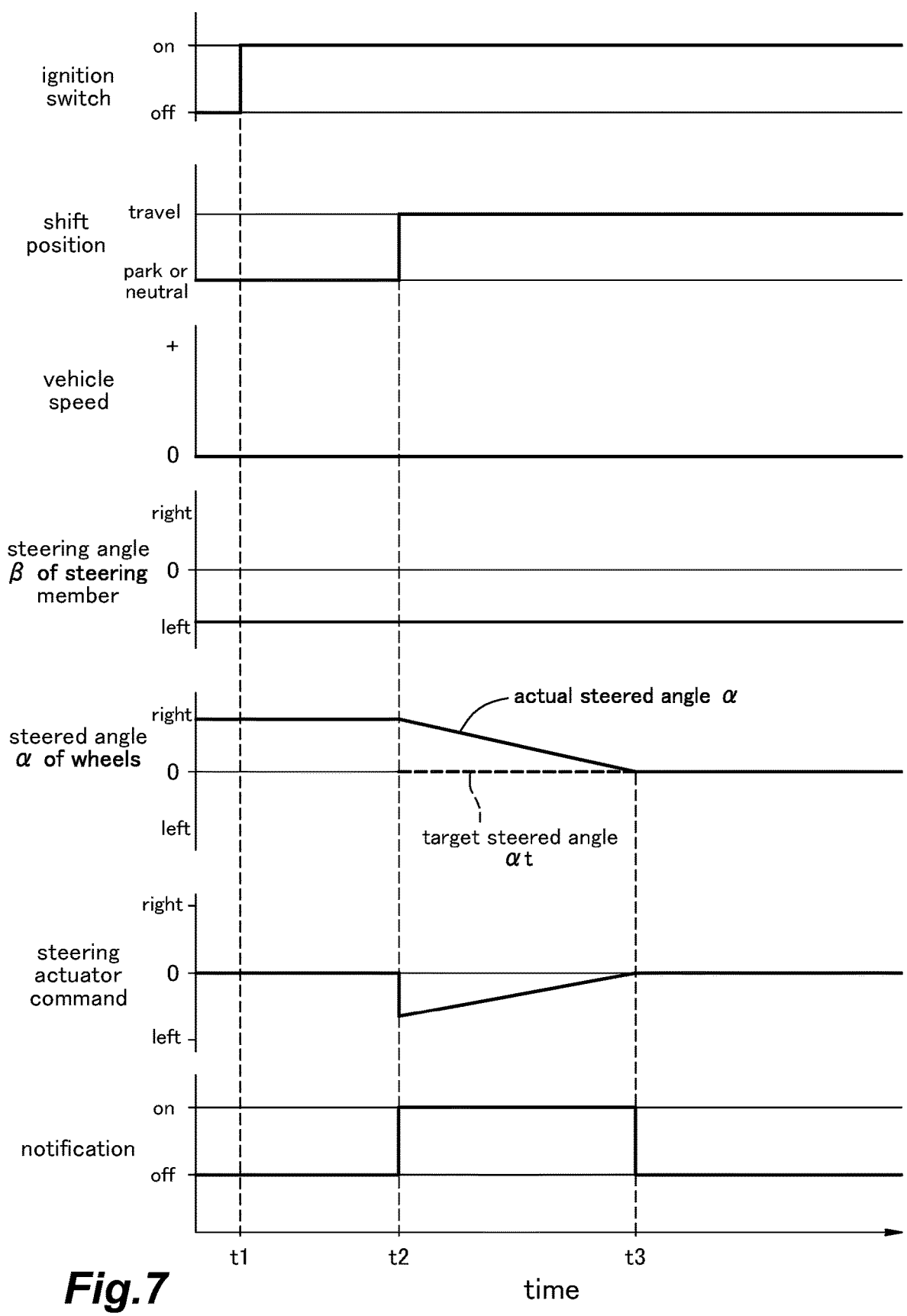
FIG. 7 is a time chart showing an example of vehicle behavior under the phase matching control.

In the example shown in FIG. 7, at time point t1, the ignition switch is turned on, and the control unit 15 is activated. At this time, the phases of the steering angle β of the steering member 10 and the steered angle α of the front wheels 3 are opposite to each other because the steering member is turned left and the front wheels are steered to the right. When the transmission shift position SP is changed from the park position "P" or the neutral position "N" to the travel position at time point t2, the control unit 15 starts the opposite phase matching (ST12) using the shift change as a trigger.

Owing to the control action of the opposite phase matching, the target steered angle α t is set to 0°, the steering actuator 12 is commanded to steer to the left, and the front wheels 3 are steered to the left. At time point t3, the steered angle α becomes 0°, and the opposite phase matching is completed. The vehicle speed V is maintained at 0 km/h from time point t2 to time point t3.

During the time interval between time point t2 and time point t3 where the opposite phase matching is executed, the control unit 15 notifies the driver by visual display or sound that the phase synchronization is in progress (phase matching is being executed).

Figure 8:
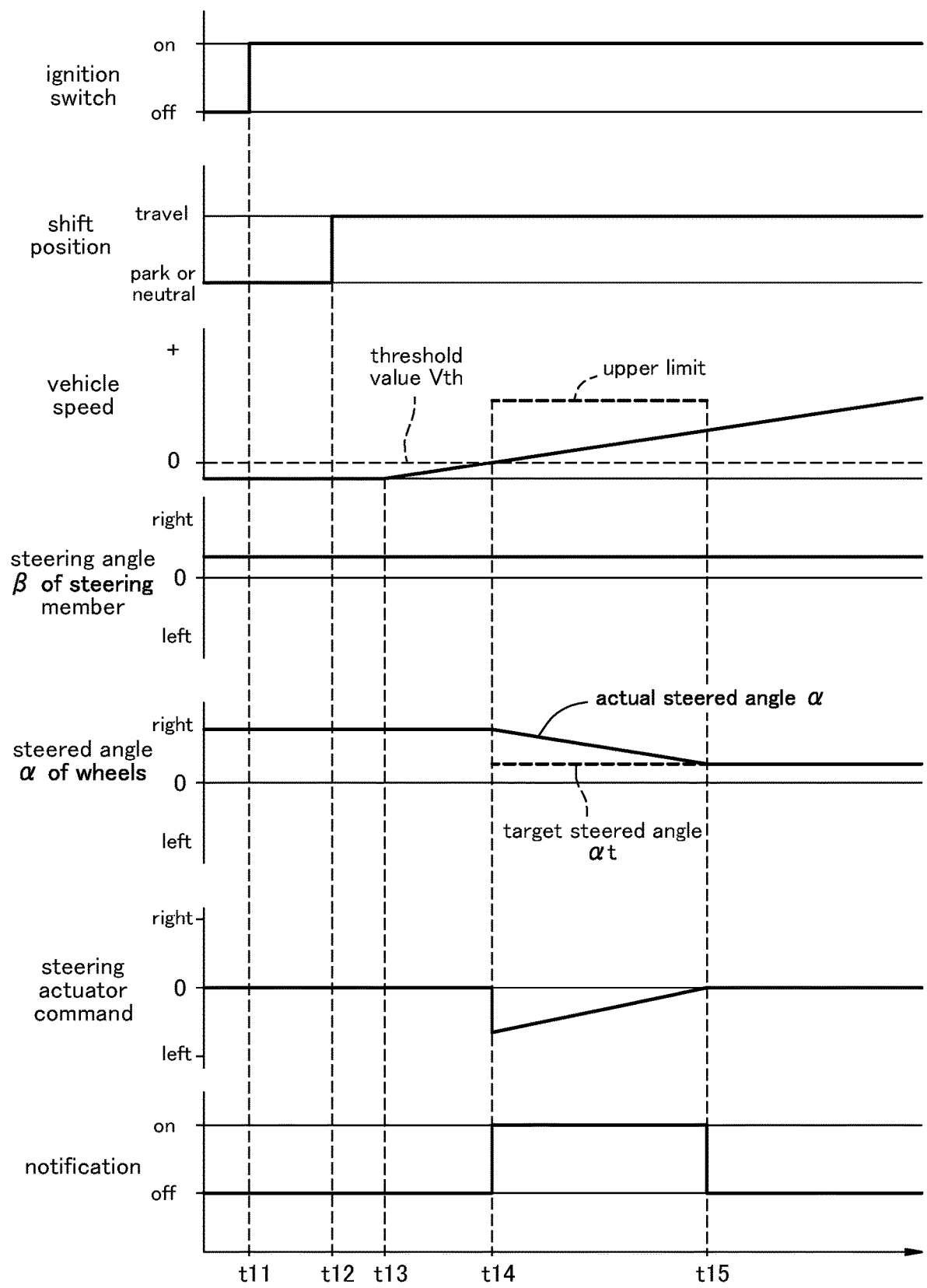
FIG. 8 is a time chart showing another example of vehicle behavior under the phase matching control.

In the example shown in FIG. 8, at time point t11, the ignition switch is turned on and the control unit 15 is activated. At this time, the phases of the steering angle β of the steering member 10 and the steered angle α of the front wheels 3 are in the same phase because the former has a small value to the right and the latter has a large value to the right. At time t12, the transmission shift position SP is changed from the park position "P" or the neutral position "N" to the travel position. As this is a case of the same phase, the opposite phase matching is not performed.

When it is determined that the vehicle 2 has started traveling at time point t13, and the vehicle speed V becomes higher than the predetermined threshold value Vth at time point t14, using this as a trigger, the control unit 15 sets an upper limit value for the vehicle speed V. Since the steering member 10 is not steered at time point t14, the control unit 15 starts the active phase matching (ST16).

Owing to the control action of the active phase matching, the target steered angle αt is set to a value corresponding to the steering angle β, and the steering actuator 12 is commanded to steer to the left so that the front wheels 3 are steered to the left. At time point t15, the actual steered angle α becomes equal to the target steered angle αt corresponding to the steering angle β, and the active phase matching is concluded. During the time interval between time point t14 and time point t15, the control unit 15 notifies the driver by visual display or sound that the phase matching is in progress (phase matching is being executed).

Figure 9:
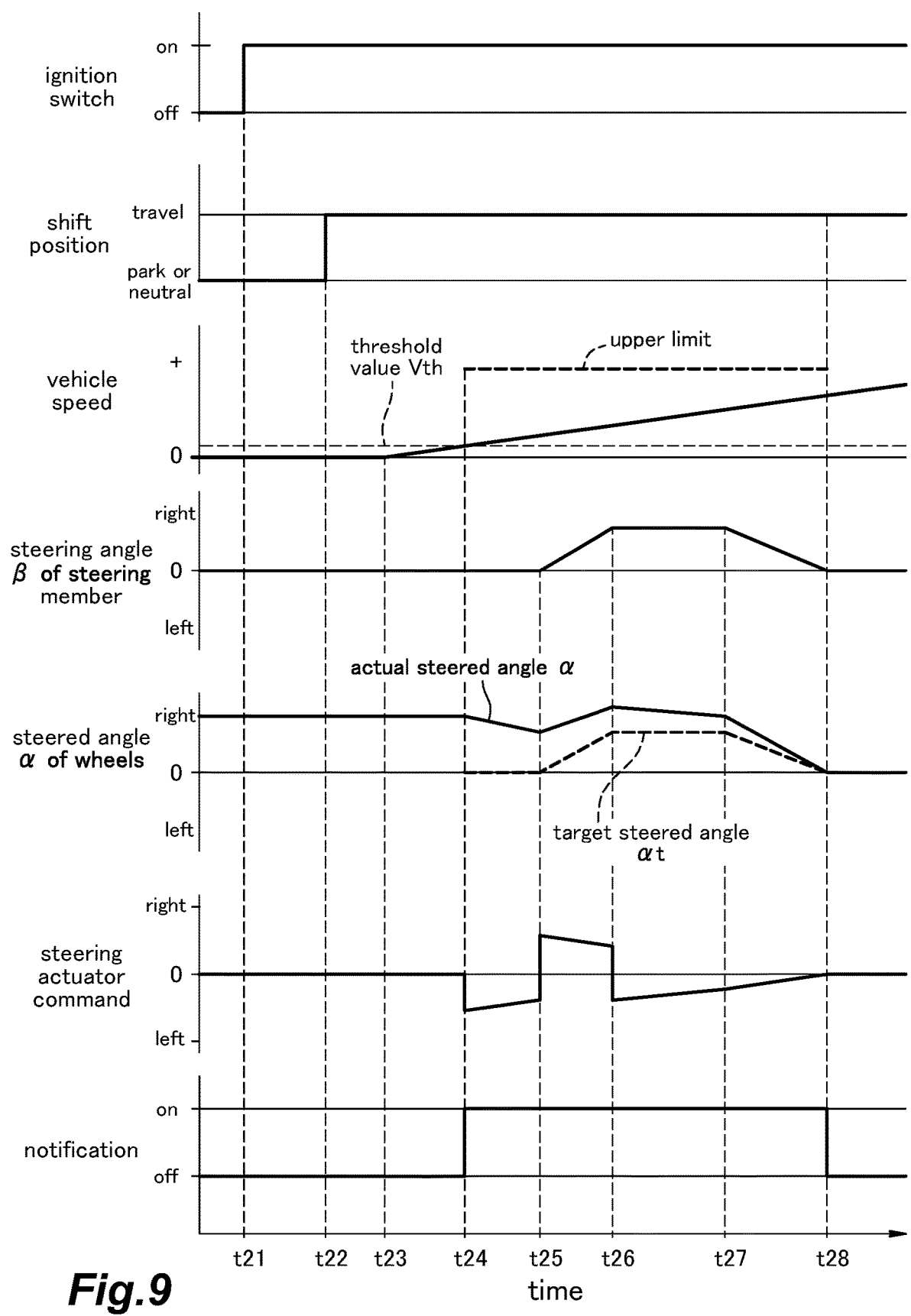
FIG. 9 is a time chart showing yet another example of vehicle behavior under the phase matching control.

In the example shown in FIG. 9, at time point t21, the ignition switch is turned on and the control unit 15 is activated. At this time, the steering angle β of the steering member 10 and the steered angle α of the front wheels 3 are in the same phase because the former is 0° and the latter is a large value to the right. At time t22, the transmission shift position SP is changed from the park position "P" or the neutral position "N" to the travel position. Since they are in the same phase, the opposite phase matching is not performed.

When it is determined that the vehicle 2 starts traveling at time point t23 and the vehicle speed V becomes larger than the predetermined threshold value Vth at time point t24, the control unit 15 sets an upper limit value for the vehicle speed V using this as a trigger. Since the steering member 10 is not steered at time point t24, the control unit 15 initiates the active phase matching (ST16).

Owing to the control action of the active phase matching, the target steered angle α t is set to a value (0°) corresponding to the steering angle β, the steering actuator 12 is commanded to steer to the left, and the front wheels 3 are steered to the left. When the steering member 10 starts to be turned to the right at time t25, the control unit 15 switches from the active phase matching to the passive phase matching (ST17). In the passive phase matching, the control unit 15 steers the front wheels 3 in the same direction as the steering member 10 so that the steered angle α of the front wheels 3 increases to the right, but the phase deviation of between the steered angle α and the steering angle β (or the deviation Δα between the actual steered angle α and the target steered angle αt which is set in accordance with the steering angle β) becomes smaller.

When the turning of the steering member 10 is stopped at time point t26, and the steering angle β starts to be maintained at a constant value without any steering operation, the control unit 15 initiates the active phase matching once again. A leftward steering command is given to the steering actuator 12, and the front wheels 3 are steered to the left. When the steering member 10 starts to be turned to the left at time point t27, the control unit 15 switches from the active phase matching to the passive phase matching again. In the passive phase matching, the control unit 15 steers the front wheels 3 in the same direction as the steering direction of the steering member 10 so that the deviation Δα between the target steered angle αt and the actual steered angle α gradually decreases. The front wheels 3 are thus steered to the left, and at time point t28, the steered angle α comes to correspond to the target steered angle α t, or the value corresponding to the steering angle β. As a result, the phases of the steering angle β and the steered angle α are matched, and the phase matching control is completed.

During the time interval between time point t24 and time point 28 or during the time the active phase matching or the passive phase matching are being executed, the control unit 15 notifies the driver by visual display or sound that the phase matching is in progress (phase matching is being executed).

As described above, according to the present embodiment, as shown in FIG. 4, if the steered angle α deviates from the prescribed relationship with respect to the steering angle β at the time of activation (ST2: Yes), using the shifting of the transmission shift position SP from the park position "P" or the neutral position "N" to the travel position (ST8: Yes), the control unit 15 drives at least one of the steering actuator 12 and the reaction force actuator 13 (ST12) so as to bring the steered angle α closer to the prescribed relationship with the steering angle β. Therefore, only when the driver has an intention to start the vehicle, the steered angle α and the steering angle β can be brought closer to the prescribed relationship.

The present invention has been described in terms of a specific embodiment, but is not limited by such an embodiment, and can be modified in various ways without departing from the scope of the present invention. In the foregoing embodiment, it was arranged such that the control unit 15 drives the steering actuator 12 in the opposite phase matching in step ST12, but the control unit 15 drive the reaction force actuator 13 instead of or in addition to the steering actuator 12. Also, the specific configuration, arrangement, quantity, angle, procedure, and the like of each member and part can be appropriately changed without deviating from the gist of the present invention. Further, all of the components shown in the above embodiments are not necessarily essential to the present invention, and can be appropriately selected and omitted without departing from the gist of the present invention.

[Reference Signs List]

| | |
|---|---|
| 1: steering device | 2: vehicle |
| 3: front wheel | 10: steering member |
| 11: steering mechanism | 12: steering actuator |
| 13: reaction force actuator | 15: control unit |

-continued

[Reference Signs List]

21: steering angle sensor
32: steered angle sensor
35: transmission device
α: steered angle
β: steering angle
SP: transmission shift position

The invention claimed is:

1. A steering system for a vehicle provided with a transmission device configured to be operated by a driver and having transmission shift positions including at least a park position or a neutral position and a travel position, comprising:
 a steering member configured to accept steering operation;
 a steering mechanism mechanically separated from the steering member and configured to steer wheels of the vehicle;
 a steering angle sensor that detects a steering angle of the steering member;
 a steered angle sensor that detects a steered angle of the wheels;
 a steering actuator configured to provide a drive force to the steering mechanism;
 a reaction force actuator configured to apply a reaction force to the steering member in response to the steering operation; and
 a control unit configured to control the steering actuator so as to cause the steered angle of the wheels to be in a prescribed relationship with the steering angle of the steering member, and control the reaction force actuator so as to cause the reaction force to correspond to a steered state of the wheels,
 wherein when a direction of the steering angle of the steering member and a direction of the steered angle of the wheels disagree from each other and the steered angle of the wheels deviates from the prescribed relationship with the steering angle of the steering member upon startup, the control unit is configured to drive at least one of the steering actuator and the reaction force actuator to bring the steered angle of the wheels closer to the prescribed relationship with the steering angle of the steering member in response to a change in the transmission shift position from the park position or the neutral position to the travel position, and
 wherein when a direction of the steering angle of the steering member and a direction of the steered angle of the wheels coincide with each other and the steered angle of the wheels deviates from the prescribed relationship with the steering angle of the steering member upon the startup, the control unit is configured to drive at least one of the steering actuator and the reaction force actuator to bring the steered angle of the wheels closer to the prescribed relationship with the steering angle of the steering member in response to an operation applied to the steering member.

2. The steering system for a vehicle according to claim 1, wherein when the direction of the steering angle of the steering member and the direction of the steered angle of the wheels are opposite to each other at startup, following an event where at least one of the steering actuator and the reaction force actuator is driven in response to a change in the transmission shift position, the control unit is configured to stop either the steering actuator or the reaction force actuator in response to an agreement in the direction of the steering angle of the steering member and the direction of the steered angle of the wheels.

3. The steering system for a vehicle according to claim 1, wherein when the direction of the steering angle of the steering member and the direction of the steered angle of the wheels coincide with each other and the steered angle of the wheels deviates from the prescribed relationship with the steering angle of the steering member upon the startup, following an event where the steering actuator is started to be driven in response to the operation applied to the steering member, the control unit is configured to cease driving the steering actuator in response to the operation being ceased to be applied to the steering member.

4. The steering system for a vehicle according to claim 1, wherein the control unit is configured to drive the steering actuator so as to bring the steered angle of the wheels closer to the prescribed relationship with the steering angle of the steering member when the steering member is operated under a condition where the direction of the steering angle of the steering member and the direction of the steered angle of the wheels are opposite to each other, and the transmission shift position is in the park position or the neutral position.

5. A steering system for a vehicle provided with a transmission device configured to be operated by a driver and having transmission shift positions including at least a park position or a neutral position and a travel position, comprising:
 a steering member configured to accept steering operation;
 a steering mechanism mechanically separated from the steering member and configured to steer wheels of the vehicle;
 a steering angle sensor that detects a steering angle of the steering member;
 a steered angle sensor that detects a steered angle of the wheels;
 a steering actuator configured to provide a drive force to the steering mechanism;
 a reaction force actuator configured to apply a reaction force to the steering member in response to the steering operation; and
 a control unit configured to control the steering actuator so as to cause the steered angle of the wheels to be in a prescribed relationship with the steering angle of the steering member, and control the reaction force actuator so as to cause the reaction force to correspond to a steered state of the wheels,
 wherein when the steered angle of the wheels deviates from the prescribed relationship with the steering angle of the steering member upon startup, the control unit is configured to drive at least one of the steering actuator and the reaction force actuator to bring the steered angle of the wheels closer to the prescribed relationship with the steering angle of the steering member in response to a change in the transmission shift position from the park position or the neutral position to the travel position, and
 wherein when the vehicle has started traveling with the steered angle of the wheels deviated from the prescribed relationship to the steering angle of the steering member at startup, the control unit is configured to set an upper limit to the vehicle speed until the steered angle of the wheels has come into the prescribed relationship with the steering angle of the steering member.

6. The steering system for a vehicle according to claim 5, wherein when the vehicle has started traveling with the steered angle of the wheels deviated from the prescribed relationship with the steering angle of the steering member at startup, the control unit is configured to drive the steering actuator so as to bring the steered angle of the wheels closer to the prescribed relationship with the steering angle of the steering member without regard if the steering member is operated or not, and to release the upper limit of the vehicle speed once the steered angle of the wheels is brought to the prescribed relationship with the steering angle of the steering member.

7. The steering system for a vehicle according to claim 6, wherein the control unit is configured to drive the steering actuator so that a change speed of the steered angle of the wheels decreases with an increase in the vehicle speed when the steering member is not operated.

8. The steering system for a vehicle according to claim 6, wherein the control unit is configured to drive the steering actuator so that the steered angle of the wheels changes faster when the steering member is operated than when the steering member is not operated.

\* \* \* \* \*